United States Patent [19]

Sasaki

[11] Patent Number: 5,051,964

[45] Date of Patent: Sep. 24, 1991

[54] VIRTUAL MICROPHONE APPARATUS AND METHOD

[75] Inventor: Tooru Sasaki, Tokyo, Japan

[73] Assignee: Sony Corporation, Tokyo, Japan

[21] Appl. No.: 570,602

[22] Filed: Aug. 21, 1990

[30] Foreign Application Priority Data

Aug. 25, 1989 [JP] Japan .............................. 1-219968

[51] Int. Cl.[5] .............................................. H04B 1/06

[52] U.S. Cl. .................................................. 367/135

[58] Field of Search ................ 367/135; 73/384, 645, 73/646, 647

[56] References Cited

PUBLICATIONS

Urick, Principles of Underwater Sound, Mar. 1984, pp. 102–103.

*Primary Examiner*—Daniel T. Pihulic

*Attorney, Agent, or Firm*—Alvin Sinderbrand; William S. Frommer

[57] ABSTRACT

An apparatus and method for producing an output signal representing a sound pressure at a predetermined position wherein a first microphone is provided for producing a first output signal representing a sound pressure $P_0$ at a first position; a second microphone is provided for producing a second output signal representing a sound pressure $P_1$ at a second position; and a signal processing circuit is provided for producing the output signal based upon the first output signal and the second output signal; wherein the signal processing circuit is operative to produce the output signal proportional to: (i) a power function of the second output signal based on an exponent m corresponding to a distance between the first microphone and the predetermined position, multiplied by (ii) a power function of the first output signal based on an exponent representing a value obtained by subtracting at least the exponent m of the power function of the second output signal from 1.

7 Claims, 3 Drawing Sheets

VIRTUAL MICROPHONE APPARATUS AND METHOD

BACKGROUND OF THE INVENTION

Field of the Invention

The present invention relates to a microphone apparatus for producing a signal representing sound pressure at an arbitrarily determined position.

A plurality of microphones can be arranged in a microphone array to achieve a desired directivity which can be adjusted easily by electrical means and which matches well with signal processing techniques. Accordingly, a substantial amount of research and development has been carried out in this area.

However, where it is sought to achieve a desired directivity while accommodating a wide band of sound frequencies, a relatively large number of microphone elements are employed in the array resulting in an increase in the outer diameter of the array. In the microphone array, sound pressure deviations (particularly, phase differences) exist among the microphone array elements and these differences provide the ability to achieve the formation of a desired directivity. The high frequency limit of the sound frequencies to be controlled determines the intervals between array elements. On the other hand, the spacing between the outermost array elements is determined by the low frequency limits. Therefore, where it is intended to obtain desired directivities over a wide frequency band, a large number of microphone elements must be employed and the outer diameter of the microphone array becomes relatively large.

As an example, a microphone array may be provided having a low frequency limit of 100 Hz and a high frequency limit of 10 kHz. In this example, the spacing between the outermost array elements is set to a value corresponding to one wave length (or one-half wave length) of the low frequency limit, so that in this example a spacing of 3.4 m is selected. On the other hand, the intervals between the adjacent array elements are set to a value corresponding to one wave length (or one-half wave length) of the high frequency limit, so that in this example the array elements are spaced by 3.4 cm. Accordingly, in this exemplary microphone array, a disadvantageously large number of array elements are required and the array must have a relatively large outer diameter.

OBJECTS AND SUMMARY OF THE INVENTION

It is, therefore, an object of the present invention to overcome the disadvantages and shortcomings of conventional microphone arrays as explained above.

It is another object of the present invention to provide a microphone array utilizing a relatively small number of array elements while achieving directivity over a wide frequency range.

It is a further object of the present invention to produce a signal representing a sound pressure at a predetermined position without the need for placing a microphone thereat, so that a microphone virtually exists at that position.

It is a still further object of the present invention to provide a microphone array and method wherein signal outputs of a plurality of array elements are combined to produce an output signal representing the output of a virtual microphone of the array.

In accordance with an aspect of the present invention, an apparatus for producing an output signal representing a sound pressure at a predetermined position comprises: first microphone means for producing a first output signal representing a sound pressure $P_0$ at a first position; second microphone means for producing a second output signal representing a sound pressure $P_1$ at a second position; and signal processing means for producing said output signal based upon said first output signal and said second output signal; said signal processing means being operative to produce said output signal proportional to: (i) a power function of said second output signal based on an exponent m corresponding to a distance between said first microphone means and said predetermined position, multiplied by (ii) a power function of said first output signal based on an exponent representing a value obtained by subtracting at least the exponent m of said power function of said second output signal from 1.

In accordance with another aspect of the present invention, a method of producing an output signal representing a sound pressure at a predetermined position comprises the steps of: providing a first microphone means for producing a first output signal representing a sound pressure $P_0$ at a first position; providing a second microphone means for producing a second output signal representing a sound pressure $P_1$ at a second position; and producing said output signal proportional to (i) a power function of said second output signal based on an exponent m corresponding to a distance between said first microphone means and said predetermined position, multiplied by (ii) a power function of said first output signal based on an exponent representing a value obtained by subtracting at least the exponent m of said power function of said second output signal from 1.

The above, and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

DETAILED DESCRIPTION OF CERTAIN PREFERRED EMBODIMENTS

Figure 1:
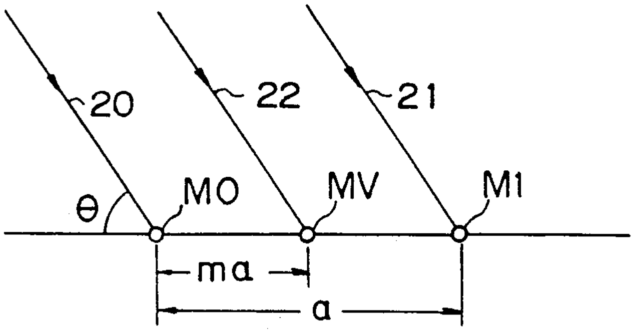
FIG. 1 is a schematic diagram of a two element microphone array providing a virtual microphone output at an arbitrary position on a line defined by the positions of the two microphone elements in accordance with an embodiment of the present invention.

With reference first to FIG. 1, a two element microphone array in accordance with a first embodiment of the present invention is illustrated schematically therein having a main microphone M0 and a sub-microphone M1 spaced apart by a distance a. MV indicates the position of a virtual microphone which is collinear with the main microphone M0 and sub-microphone Ml and is spaced from the main microphone M0 by an arbitrary distance ma. A plane wave which has arrived at the microphones M0 and Ml at an incident angle 8 with respect to the line determined by the positions of the microphones M0 and M1 produces sound pressures thereat represented by vectors 20 and 21, respectively. A sound pressure simultaneously experienced at the virtual microphone position MV represented by a vector 22 is obtained with the use of the output signals from the microphones M0 and M1.

The sound pressure incident at the microphone M0 is designated $P_0$. A simultaneously incident sound pressure at the sub-microphone M1 designated $P_1$ may be expressed in terms of the sound pressure $P_0$ as follows:

$$P_1 = P_0 e^{-jka(\cos\Theta)} \quad (1)$$

where k is defined by the angular frequency $\Omega$ of the plane wave and the sound velocity c thereof, such that $k=\Omega/c$.

The sound pressure simultaneously incident at the position of the virtual microphone MV designated as $P_V$ may be defined in terms of the sound pressure incident on the main microphone M0 on the basis of the distance ma therebetween as follows:

$$P_v = P_0 e^{-jk(ma)(\cos\Theta)} \quad (2)$$

Equation (2) may be rewritten on the basis of equation (1) to express the sound pressure $P_V$ at the position of the virtual microphone MV in terms of the pressures $P_0$ and $P_1$ as follows:

$$P_V = P_o^{1-m} \cdot P_1^{m} \quad (3)$$

The value m may be selected arbitrarily as a positive or negative real number. When m is selected as a negative number, the sound pressure $P_V$ at a virtual microphone position to the left side of the microphone M0 as shown in FIG. 1 is obtained. When the value M is selected as 1 or greater, the sound pressure at a virtual microphone position to the right side of the sub-microphone M1 is obtained.

Since the sound pressure $P_1$ of the sub-microphone M1 and the sound pressure $P_V$ at the virtual microphone position MV are expressed in equations (1) and (2) on the basis of phase differences with the sound pressure $P_0$ of the microphone M0, the sound pressure $P_V$ is most accurately obtained when $|\text{ka} \cos \Theta| < \pi$ or $|\text{kma} \cos \Theta| < \pi$. However, there are circumstances in which it is unnecessary to so limit the operating conditions of the microphone array.

Figure 2A:
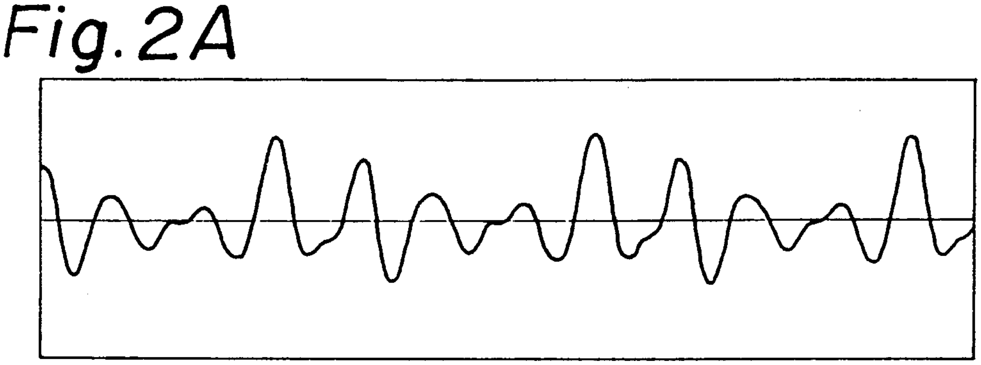
FIGS. 2A–2D are waveform diagrams illustrating waveforms produced with the use of a microphone array of the type shown in FIG. 1.
Figure 2B:
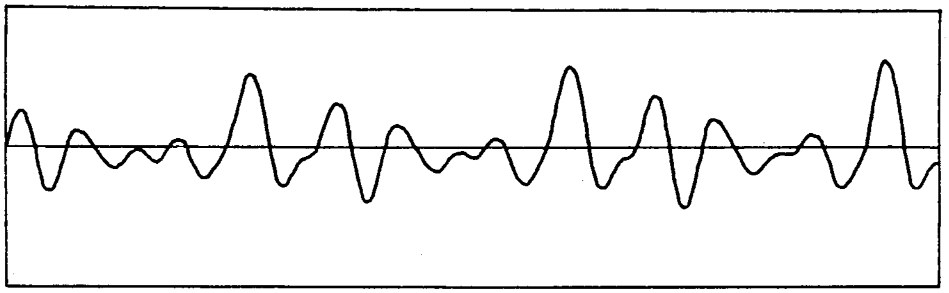
Figure 2C:
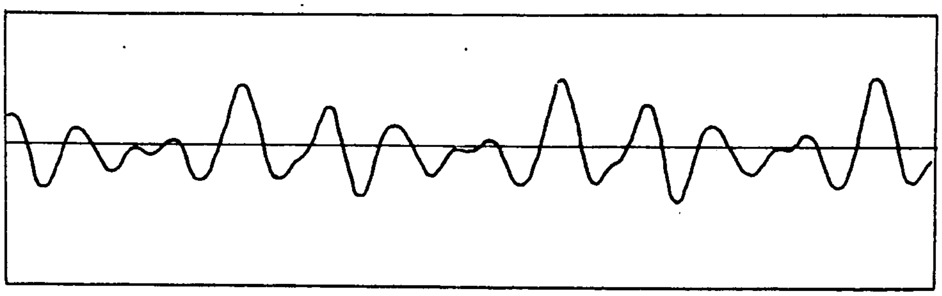
Figure 2D:
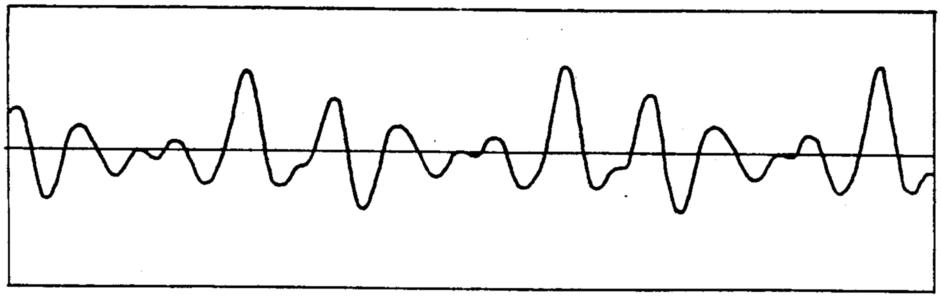

FIGS. 2A through 2D illustrate waveforms obtained with a microphone array of the type illustrated in FIG. 1. FIG. 2A illustrates the waveform of an output signal produced by a main microphone of such array, while FIG. 2B illustrates the waveform of an output signal produced by a sub-microphone thereof. FIG. 2C illustrates a waveform produced on the basis of a calculation of the output of a virtual microphone positioned on the line determined by the positions of the main and sub-microphones utilizing the values of the output signals produced thereby with the use of the relationship expressed in equation (3). FIG. 2D illustrates a waveform obtained with the use of a microphone at the position of the virtual microphone. It will be seen through a comparison of the waveforms of FIGS. 2C and 2D that the relative phases and amplitudes of the respective calculated and measured signals closely correspond.

Figure 3:
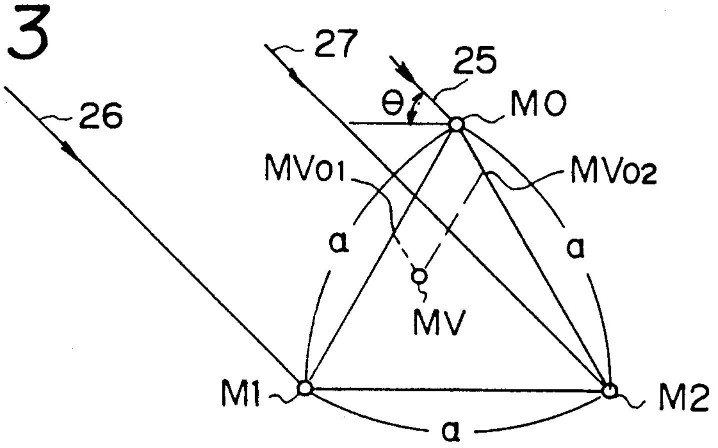
FIG. 3 is a schematic diagram of a three element microphone array which is operative to produce a virtual microphone output at an arbitrarily selected position in a common plane therewith in accordance with another embodiment of the present invention.

With reference to FIG. 3, an array of three microphones M0, M1 and M2 in accordance with a second embodiment of the present invention is provided in which the microphone positions define the vertices of an equilateral triangle wherein the length of each side is represented by a value a. Vectors 25, 26 and 27 represent pressures produced by a plane wave incident on the microphones M0, M1 and M2, respectively, at an angle $\Theta$ measured with respect to the side of the equilateral triangle defined by the positions of the microphones M1 and M2. In accordance with the second embodiment, the sound pressure at a virtual microphone position MV lying substantially in the same plane as the microphones M0–M2 as illustrated in FIG. 3 is obtained on the basis of the outputs of the microphones M0, M1 and M2. If the sound pressure incident on the microphone M0 is represented by $P_0$, and the sound pressure incident on the microphone M1 is designated as $P_1$, the pressure $P_1$ may be expressed in terms of the pressure $P_0$ as follows:

$$P_1 = P_0 e^{-jka[\cos(\Theta - 2\pi/3)]} \quad (4)$$

If the sound pressure simultaneously incident on the M2 is designated as $P_2$, the sound pressure $P_2$ may likewise be expressed in terms of the pressure $P_0$ incident on the microphone $M_0$ as follows:

$$P_2 = P_o e^{-jka[\cos(\Theta - \pi/3)]} \quad (5)$$

As shown in FIG. 3, the virtual microphone position MV is defined with respect to the two sides of the equilateral triangle lying between the microphone positions M0 and M1 and between the microphone positions M0 and M2. A first coordinate thereof designated $MV_{01}$, on the line determined by the positions of the microphones M0 and M1 is obtained by projecting the virtual microphone position MV onto said line in a direction parallel to the line determined by the positions of the microphones M0 and M2. The distance from the microphone M0 to the coordinate position $MV_{01}$ is designated as ma. At the same time, a second coordinate position $MV_{02}$ on the line defined by the positions of the microphones M0 and M2 is obtained by projecting the virtual microphone position onto said line in a direction parallel to the line defined by the positions of the microphones M0 and M1, where the distance between the microphone M0 and the coordinate position $MV_{02}$ is designated as na. The values m and n represent arbitrarily selected real numbers.

If a value of the sound pressure incident at the coordinate position $MV_{01}$ is designated as $P_{V01}$, the sound pressure $P_{V01}$ may be expressed in terms of the pressure $P_0$ simultaneously incident on the microphone M0 as follows:

$$P_{V01} = P_0 e^{-jk(ma)[\cos(\theta - 2\pi/3)]} = P_0^{1-m} \cdot P_1^m \quad (6)$$

If the sound pressure at the point of the coordinate location $MV_{02}$ is designated as $P_{V02}$, the pressure $P_{V02}$ at the coordinate position $MV_{02}$ may be expressed in terms of the pressure $P_0$ simultaneously incident at the microphone M0 as follows:

$$P_{V02} = P_0 e^{-jk(na)[\cos(\theta - \pi/3)]} = P_0^{1-n} \cdot P_2^n \quad (7)$$

The sound pressure $P_V$ at the virtual microphone position MV may be expressed in terms of the simultaneous sound pressure $P_{V01}$ at the coordinate position $MV_{01}$, which is spaced from the virtual microphone position MV by a distance na as follows:

$$P_v = P_{V01} e^{-jk(na)[\cos(\theta - \pi/3)]} = P_0 e^{-jk(ma)[\cos(\theta - 2\pi/3)]} \cdot e^{-jk(na)[\cos(\theta - \pi/3)]} \quad (8)$$

Equation 8 may be restated in terms of the sound pressures incident on the microphones M0, M1 and M2 with the use of the relationships expressed in equations (6) and (7) as follows:

$$P_v = P_0^{1-n} \cdot P_2^n \frac{P_0^{1-m} \cdot P_1^m}{P_0} = P_0^{(1-m-n)} \cdot P_1^m \cdot P_2^n \quad (9)$$

It will be seen from equation (9) that the sound pressure simultaneously appearing at the virtual microphone position MV which is co-planar with the microphones M0, M1 and M2 may be obtained on the basis of their respective output signals.

Figure 4:
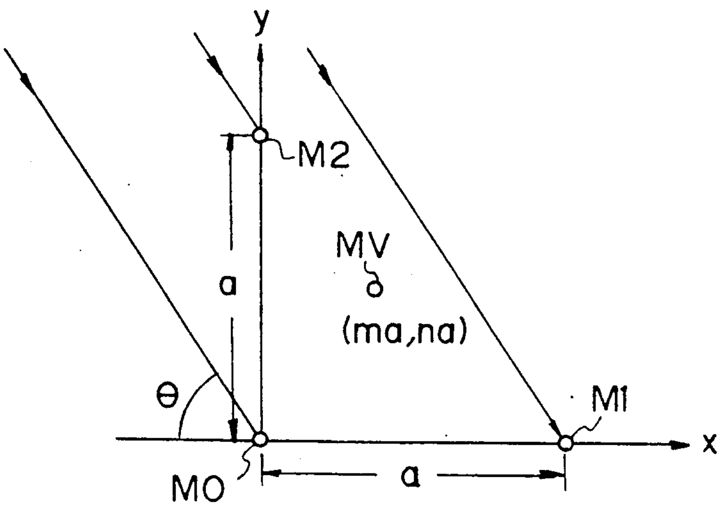
FIG. 4 is a schematic diagram of another three element microphone array for providing a virtual microphone output at an arbitrarily selected position in a common plane therewith in accordance with still another embodiment of the present invention.

With reference now to FIG. 4, a still further embodiment of the present invention is illustrated schematically therein in which three microphones M0, M1 and M2 are arranged at the vertices of a right triangle. It will be seen from the following description of the FIG. 4 embodiment that a signal representing a sound pressure at a virtual microphone position may be obtained in accordance with the present invention by three microphones arranged in a triangular array whose shape is arbitrarily selected. Stated differently, since the position of an arbitrary point in a plane may be expressed by a linear combination of two non-parallel vectors, by arranging three microphones so that they define two such vectors, the sound pressure existing at an arbitrarily selected position in the plane can be obtained.

In the embodiment of FIG. 4, the microphones M0–M2 are arranged so as to define two orthogonal vectors. In this arrangement, the line defined by the positions of the microphones M0 and M1 spaced apart by a distance a is designated an x axis, while a line determined by the positions of the microphones M0 and M2 spaced apart by a distance a is designated a y axis. A virtual microphone position MV is defined by coordinates (ma, na) with respect to the x and y axes. If the sound pressure at the virtual microphone position MV is designed $P_V$, it may be obtained from the pressures designated $P_0$, $P_1$ and $P_2$ simultaneously incident on the microphones M0, M1 and M2, respectively, as follows:

$$P_V = P_0^{(1-m-n)} \cdot P_1^m \cdot P_2^n \quad (10)$$

Figure 5:
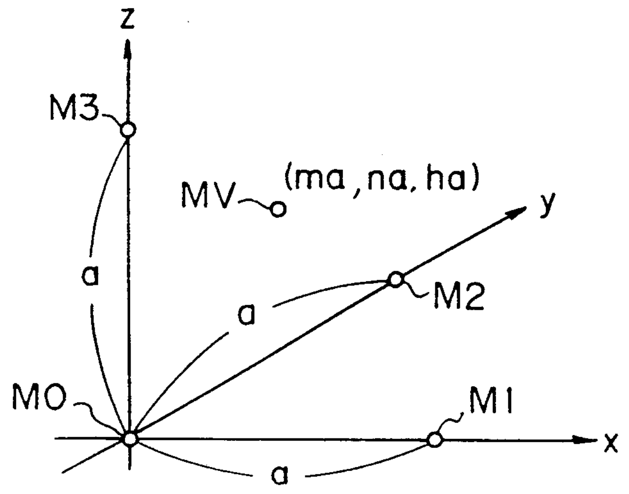
FIG. 5 is a schematic diagram of a four element microphone array for providing a virtual microphone output at an arbitrary position in three dimensional space in accordance with a further embodiment of the present invention.

In accordance with another embodiment of the present invention, a sound pressure at a virtual microphone position determined arbitrarily in three-dimensional space is obtained by means of a microphone array defining three vectors which do not all lie in the same plane. As illustrated in FIG. 5, an array of four microphones is arranged with respect to orthogonal x, y and z axes, such that a first microphone M0 is positioned at the origin of the axes, a second microphone M1 is located on the x axis spaced by a distance a from the first microphone M0, a third microphone M2 is arranged on the y axis spaced by a distance a from the first microphone M0 and a fourth microphone M3 is arranged on the z axis spaced by a distance a from the microphone M0. An arbitrarily selected virtual microphone position MV is defined by (x, y, z) coordinates (ma, na, ha) in the three-dimensional space defined by the x, y and z axes. If a sound pressure at the virtual microphone position MV is designated $P_V$, the value of $P_V$ is obtained in accordance with the embodiment of FIG. 5 in terms of sound pressures P0–P3 simultaneously incident at the microphones M0–M3 as follows:

$$P_v = P_0^{(1-m-n-h)} \cdot P_1^m \cdot P_2^n \cdot P_3^h \quad (11)$$

While the microphone array of the FIG. 5 embodiment defines 3 orthogonal vectors, the present invention is not so limited and also embraces the use of three-dimensional microphone arrays defining non-orthogonal vectors arbitrarily arranged.

Figure 6:
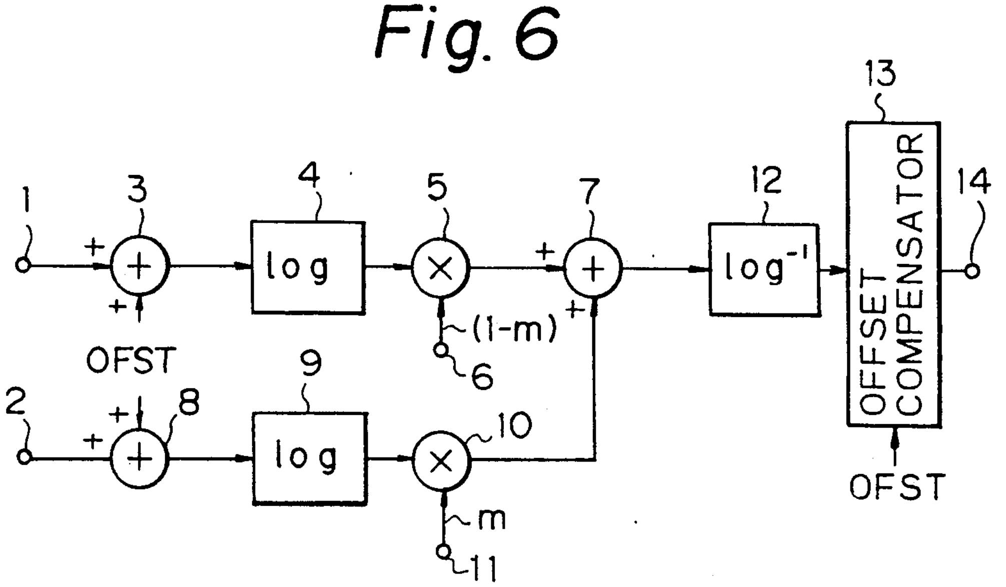
FIG. 6 is a block diagram of a signal processing circuit for use with the embodiment of FIG. 1.

Referring to FIG. 6, an embodiment of a signal processing circuit for combining the output signals from a microphone array of the type illustrated in FIG. 1 to produce an output representing a sound pressure at a virtual microphone position, in accordance with equation (3) above, is presented in the form of a block diagram. The signal processing circuit of FIG. 6 includes a first input terminal 1 for receiving the output signal from the main microphone M0 of the microphone array of FIG. 1. The signal processing circuit includes a second input terminal 2 for receiving the output signal from the sub-microphone M1 of the microphone array of FIG. 1. A first adding circuit 3 has a first input terminal connected with the input terminal 1 to receive the output signal from the microphone M0 and a second input terminal supplied with a predetermined offset value OFST so that the first adding circuit 3 supplies the output signal from the microphone M0 offset by OFST at an output terminal thereof. The output terminal of the first adding circuit 3 is connected with an input terminal of a first logarithmic amplifier 4 which serves to convert the offset output signal from the microphone signal M0 to a signal representing a logarithmic value thereof. It will be appreciated that, by increasing the output from the microphone MO by an offset value, the provision of a negative input signal to the logarithmic amplifier 4 may be avoided. An output of the first logarithmic amplifier 4 is connected to a first input terminal of a first multiplying circuit 5. A second input of the first multiplying circuit 5 is connected to an input terminal 6 to receive a coefficient $(1-m)$ where m is determined as described above in connection with FIG. 1. Accordingly, the first multiplying circuit 5 supplies a signal at an output terminal thereof representing a logarithm of the term $(P_0+OFST)^{1-m}$. The output terminal of the first multiplying circuit 5 is connected with a first input terminal of a second adding circuit 7.

Input terminal 2 is connected to a first input of a third adding circuit 8 to provide the output signal of the sub-microphone M1 thereto. A second input of the third adding circuit 8 is supplied with the predetermined offset value OFST, so that the third adding circuit 8 supplies the output signal of the sub-microphone M1 whose level is shifted by the amount of the predetermined offset value OFST. The output terminal of the third adding circuit 8 is connected to an input of a second logarithmic amplifier 9 which serves to provide a signal at an output terminal thereof representing a logarithmic value of the offset output of the sub-microphone M1. The output terminal of the second logarithmic amplifier 9 is connected to a first input terminal of a second multiplying circuit 10 having a second input terminal connected with an input terminal 11 of the signal processing circuit to which a signal representing the value m is supplied. Accordingly, the second multiplying circuit 10 serves to provide a signal at an output terminal thereof representing a logarithm of the value $(P_1+OFST)^m$ and is connected with a second input terminal of the second adding circuit 7 to supply said logarithmic value thereto.

The second adding circuit 7 serves to provide an output signal at an output terminal thereof representing a summation of the input signals supplied to its first and second inputs and it will be appreciated, therefore, that the signal thus supplied to its output terminal represents a logarithm of the value $(P_0+OFST)^{1-m} \cdot (P_1+OFST)^m$. The output of the second adding circuit 7 is connected with an input of an inverse logarithmic amplifier 12 which produces a signal at an output terminal thereof representing the value $(P_0+OFST)^{1-m} \cdot (P_1+OFST)^m$.

The output terminal of the inverse logarithmic amplifier 12 is connected with a first input of an offset compensator 13 provided with the offset value OFST at a second input thereof and which serves to cancel the effect of the offset value present in the output from the inverse logarithmic amplifier 12 by a suitable subtractive operation thus to provide an output signal having a value substantially equal to the sound pressure at the virtual microphone position $P_V$. In one advantageous embodiment, the offset compensator 13 takes the form of a subtracting circuit for subtracting the value OFST from the output of the inverse logarithmic amplifier 12. It will be appreciated that the use of a subtracting circuit will serve to eliminate the predominant signal component contributed by OFST, thus providing a good approximation of the value $P_0^{1-m} \cdot P_1^m$, while permitting the use of a relatively simple and straightforward circuit design.

The circuit of FIG. 6 is readily implemented with analog devices since the power functions are carried out after logarithmic transformation. In place of the analog signal processing circuit of FIG. 6, a digital signal processing circuit may be provided for producing an output signal representing the sound pressure $P_V$ at the virtual microphone position MV. It will be appreciated that such a digital signal processing apparatus may comprise either or both of hard wired digital circuits and/or programmable apparatus. It will also be appreciated that digital signal processing techniques permit the direct calculation of power functions so that the steps of converting signals to logarithmic form are unnecessary.

It will be seen, therefore, that the present invention provides the ability to produce a signal representing the sound pressure at an arbitrarily determined position on the basis of signals produced by an array of microphones without the need to place a microphone at such arbitrary position, while providing a high degree of directivity and wideband operation which are realized with the use of a minimum number of array elements. Accordingly, the microphone array of the present invention may be miniaturized and the number of elements therein reduced in comparison with conventional microphone arrays. In light of the foregoing, the present invention provides the ability to minimize the variations among the elements of the microphone array.

Although specific embodiments of the invention have been described herein, it is to be understood that the invention is not limited to the embodiments disclosed, and that various changes and modifications may be effected therein by one skilled in the art without departing from the scope or spirit of the invention as defined in the appended claims.

What is claimed is:

1. An apparatus for producing an output signal representing a sound pressure at a predetermined position, comprising:

first microphone means for producing a first output signal representing a sound pressure $P_0$ at a first position;

second microphone means for producing a second output signal representing a sound pressure $P_1$ at a second position; and signal processing means for producing said output signal based upon said first output signal and said second output signal;

said signal processing means being operative to produce said output signal proportional to:

(i) a power function of said second output signal based on an exponent m corresponding to a distance between said first microphone means and said predetermined position, multiplied by (ii) a power function of said first output signal based on an exponent representing a value obtained by subtracting at least said exponent m from 1.

2. An apparatus according to claim 1, wherein said signal processing means is operative to produce said output signal representing a sound pressure at a predetermined position on a line determined by the positions of said first microphone means and said second microphone means such that said output signal is proportional to a value:

$$P_0^{1-m} \cdot P_1^m$$

where m is a ratio of a distance between said first microphone means and said predetermined position to a distance between said first microphone means and said second microphone means.

3. An apparatus for producing an output signal representing a sound pressure at a predetermined position, comprising:

first microphone means for producing a first output signal representing a sound pressure $P_0$ at a first position;

second microphone means for producing a second output signal representing a sound pressure $P_1$ at a second position;

third microphone means for producing a third output signal representing a sound pressure $P_2$ at a third position, said first microphone means, said second microphone means and said third microphone means being positioned to produce respective first, second and third output signals representing sound pressures at corresponding positions lying substantially in a common plane;

and signal processing means operative to produce said output signal representing a sound pressure at a predetermined position substantially coplanar with said corresponding positions such that said output signal is proportional to a value:

$$P_o^{(1-m-n)} \cdot P_1^m \cdot P_2^n$$

where m is a ratio whose denominator is a value representing a distance between said first position and said second position along a first line determined thereby and whose numerator is a value representing a distance along said first line from said first position to a position on said first line obtained by projecting said predetermined position onto said first line in a direction based on the first and third positions corresponding with said first microphone means and said third microphone means, respectively, and n is a ratio whose denominator is a value representing a distance from said first position to said third position along a second line determined thereby and whose numerator is a value representing a distance along said second line from said first position to a position on said record line obtained by projecting said predetermined position onto said second line in a direction based on the first and second positions corresponding with said first microphone means and said second microphone means, respectively.

4. An apparatus for producing an output signal representing a sound pressure at a predetermined position, comprising:

first microphone means for producing a first output signal representing a sound pressure $P_0$ at a first position;

second microphone means for producing a second output signal representing a sound pressure $P_1$ at a second position;

third microphone means for producing a third output signal representing a sound pressure $P_2$ at a third position; and fourth microphone means for producing a fourth output signal representing a sound pressure $P_3$ at a fourth position outside of a common plane of the first, second and third positions; and signal processing means operative to produce said output signal representing a sound pressure at a predetermined position other than the first through fourth positions such that said output signal is proportional to a value:

$$P_0^{(1-m-n-h)} \cdot P_2^n \cdot P_3^h$$

where m is a ratio whose denominator is a value representing a distance between said first position and said second position along a first line determined thereby and whose numerator is a value representing a distance along said first line from said first position to a position on said first line obtained by projecting said predetermined position onto said first line in a direction based on the first, third and fourth positions;

where n is a ratio whose denominator is a value representing a distance between said first position and said third position along a second line determined thereby and whose numerator is a value representing a distance along said second line from said first position to a position on said second line obtained by projecting said predetermined position onto said second lien in a direction based on the first, second and fourth positions, and where h is a ratio whose denominator is a value representing a distance between said first position and said fourth position along a third line determined thereby and whose numerator is a value representing a distance along said third line obtained by projecting said predetermined position onto said third line in a direction based on the first, second and third position.

5. The apparatus according to claim 1, wherein said signal processing means is operative to process said first output signal and said second output signal in digital form.

6. An apparatus according to claim 1, wherein said signal processing means includes:

first logarithmic function means for producing a first logarithmic signal representing a logarithm of said first output signal;

first multiplying means for producing a second logarithmic signal representing a product of said first logarithmic signal and a coefficient $(1-m)$;

second logarithmic functions means for producing a third logarithmic signal representing a logarithm of said second output signal;

second multiplying means for producing a fourth logarithmic signal representing a product of said third logarithmic signal and a coefficient (m);

adding means for producing a summation signal representing a summation of said second logarithmic signal and said fourth logarithmic signal; and inverse logarithmic function means for producing said output signal representing an inverse logarithmic function of said summation signal.

7. A method of producing an output signal representing a sound pressure at a predetermined position, comprising the steps of:

providing a first microphone means for producing a first output signal representing a sound pressure $P_0$ at a first position;

providing a second microphone means for producing a second output signal representing a sound pressure $P_1$ at a second position; and producing said output signal proportional to:

(i) a power function of said second output signal based on an exponent m corresponding to a distance between said first microphone means and said predetermined position, multiplied by (ii) a power function of said first output signal based on an exponent representing a value obtained by subtracting at least said exponent m from 1.

* * * * *